(12) United States Patent
Conrad et al.

(10) Patent No.: US 10,684,438 B2
(45) Date of Patent: Jun. 16, 2020

(54) OPTICAL FIBER REARRANGEMENT DEVICE WITH CONTAINMENT CHANNELS

(71) Applicant: US Conec, Ltd., Hickory, NC (US)

(72) Inventors: Craig M. Conrad, Hickory, NC (US); Darrell R. Childers, Hickory, NC (US); Brian J. Gimbel, Hickory, NC (US); Brian Pruett, Hickory, NC (US); Myron W. Yount, Conover, NC (US)

(73) Assignee: US Conec, Ltd., Hickory, NC (US)

(*) Notice: Subject to any disclaimer, the term of this patent is extended or adjusted under 35 U.S.C. 154(b) by 0 days.

(21) Appl. No.: 16/046,152

(22) Filed: Jul. 26, 2018

(65) Prior Publication Data

US 2018/0341080 A1 Nov. 29, 2018

Related U.S. Application Data

(63) Continuation of application No. 15/237,561, filed on Aug. 15, 2016, now Pat. No. 10,042,137.

(60) Provisional application No. 62/205,687, filed on Aug. 15, 2015.

(51) Int. Cl.
*G02B 6/44* (2006.01)

(52) U.S. Cl.
CPC ........... *G02B 6/4471* (2013.01); *G02B 6/448* (2013.01); *G02B 6/4403* (2013.01)

(58) Field of Classification Search
CPC .......................................... G02B 6/4471–4475
See application file for complete search history.

(56) References Cited

U.S. PATENT DOCUMENTS

| | | | |
|---|---|---|---|
| 6,259,851 B1* | 7/2001 | Daoud | G02B 6/3801 174/74 R |
| 6,464,404 B1 | 10/2002 | Robinson et al. | |
| 6,554,483 B1 | 4/2003 | Sun et al. | |
| 6,619,853 B2 | 9/2003 | Grois et al. | |
| 6,763,166 B2 | 7/2004 | Yow et al. | |
| 6,947,655 B2 | 9/2005 | Rubino et al. | |
| 7,418,186 B1* | 8/2008 | Grubish | G02B 6/4477 385/135 |
| 9,128,214 B2 | 9/2015 | Wakjira et al. | |
| 2002/0181884 A1* | 12/2002 | Fujioka | G02B 6/3825 385/53 |

* cited by examiner

*Primary Examiner* — Jerry Rahll
(74) *Attorney, Agent, or Firm* — Michael L. Leetzow, P.A.; Shubhrangshu Sengupta

(57) ABSTRACT

A device for rearranging optical fibers has a proximal and distal ends. The ends have openings therein to allow optical fibers to pass therethrough. The openings in the distal end have a width that is less than twice the optical fiber's diameter. Dividers separate the distal end openings and have a projection that narrows the distal openings to prevent the optical fibers from accidentally moving out of the openings. A lid is also provided to assist with organization and compression of the optical fibers.

20 Claims, 12 Drawing Sheets

OPTICAL FIBER REARRANGEMENT DEVICE WITH CONTAINMENT CHANNELS

REFERENCE TO RELATED CASE

This application claims priority under 35 U.S.C. § 119 (e) to provisional application No. 62/205,687 filed on Aug. 15, 2015, and under 35 U.S.C. § 120 to U.S. patent application Ser. No. 15/237,561, filed on Aug. 15, 2016, the contents of which are hereby incorporated by reference in their entirety.

BACKGROUND OF THE INVENTION

Field of the Invention

Optical fiber cables and ribbons typically have twelve optical fibers or sets of twelve optical fibers. The optical fibers in these sets of optical fibers are colored and an in a particular order, thereby allowing those working with the optical fibers an easy way to identify the optical fibers within each set. As is known in the art, the colors and order of the optical fibers is blue, orange, green, brown, slate, white, red, black, yellow, violet, rose, and aqua. However, there are situations where the optical fibers of one color from a number of sets of optical fibers need to be arranged in a grouping. For example, the blue optical fibers from a number of fiber optic ribbons need to be grouped together. These groupings of optical fibers then can be ribbonized, bundled, placed in a heat shrink tube, or covered with a cable jacket or other protective device. This is generally known as a optical fiber shuffle.

Currently, the shuffle is being done by hand or a combination of a very expensive machine that positions the fibers on an adhesive sheet placed on a table. As illustrated in FIG. 1, there are five fiber optic cables 10 (but could also be ribbons), each of which have 12 optical fibers. The first optical fiber 12 in each of the fiber optic cables 10 are routed to a first position 14 on an adhesive sheet 16. Then the second optical fiber 18 from each of the fiber optic cables 10 is routed to a second position 20 on the adhesive sheet 16. As illustrated in FIG. 1, there are a number of optical fibers at the bottom of the figure that are yet to be placed on the adhesive sheet 16. Typically, the machine distributes the first optical fiber 12 from each of the fiber-optic cables 10 on the adhesive sheet 16. The technician then places the subsequent 11 optical fibers on the adhesive sheet 16. However, the machine could place all of the fibers as required. Also as illustrated in FIG. 1, a heat shrink 22 or other protective device can be used to protect the distributed optical fibers. This procedure it is time consuming, requires expert manual dexterity, and expensive when the machine is involved. Although the example above reorganizes the fibers so that each ribbon consists of fibers all the same color, the ribbon could be made using any colored fibers in any order. Thus, a device that allows for optical fibers to be easily and repeatedly shuffled or reorganized is needed.

SUMMARY OF THE INVENTION

The present invention is directed to a device for reorganizing optical fibers from a first grouping to a second grouping that includes a proximal end having at least one opening through which the optical fibers pass, a distal end having a first plurality of openings through which the optical fibers pass, each of the first plurality of openings having a divider therebetween, each opening in the first plurality of openings having a width that is less than twice the optical fiber's diameter.

In some embodiments, the at least one opening at the proximal end comprises a second plurality of openings, each of the openings in the second plurality of openings having a divider therebetween.

In some other embodiments, the device also includes at least one, and usually two, projection extending into each of the first plurality of openings, the projection narrowing the opening to less than a diameter of an optical fiber.

In another embodiment, the dividers at the proximal end and the distal end have an upper surface, the upper surface being flat and parallel to an axis extending along a length of the optical fibers and further comprising a lid, the lid having a main body portion to engage the upper surfaces of the dividers, the lid having at least four edges and one side portion, the side portion extending from the main body adjacent one edge in a generally orthogonal direction, the side portion aligning with the distal end to compress the optical fibers in each of the first plurality of openings.

According to another aspect of the present invention, there is a device for reorganizing optical fibers from a first grouping to a second grouping that includes a proximal end having at least one opening through which the optical fibers pass, a distal end having a first plurality of openings through which the optical fibers pass, each of the first plurality of openings having a divider therebetween, each of the first plurality of openings having a width that is less than twice the optical fiber's diameter, and two side walls extending between the proximal and distal ends to generally form a rectangular structure, the side walls and the dividers having a top surface.

According to yet another embodiment, a device for reorganizing optical fibers from a first grouping of optical fibers to a second grouping of optical fibers that includes a proximal end having at least one opening through which the optical fibers pass, and a distal end having a first plurality of openings through which the optical fibers pass, each of the first plurality of openings having a divider therebetween, each opening in the first plurality of openings having a width that is less than twice the optical fiber's diameter, wherein the first grouping includes at least two sets of a first plurality of optical fibers and the second grouping of optical fibers includes at least two sets of a second plurality of optical fibers, no two optical fibers being in the same set of optical fibers in the first and second groupings.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description, serve to explain the principles and operations of the invention.

DETAILED DESCRIPTION OF THE PREFERRED EMBODIMENTS

Figure 1:
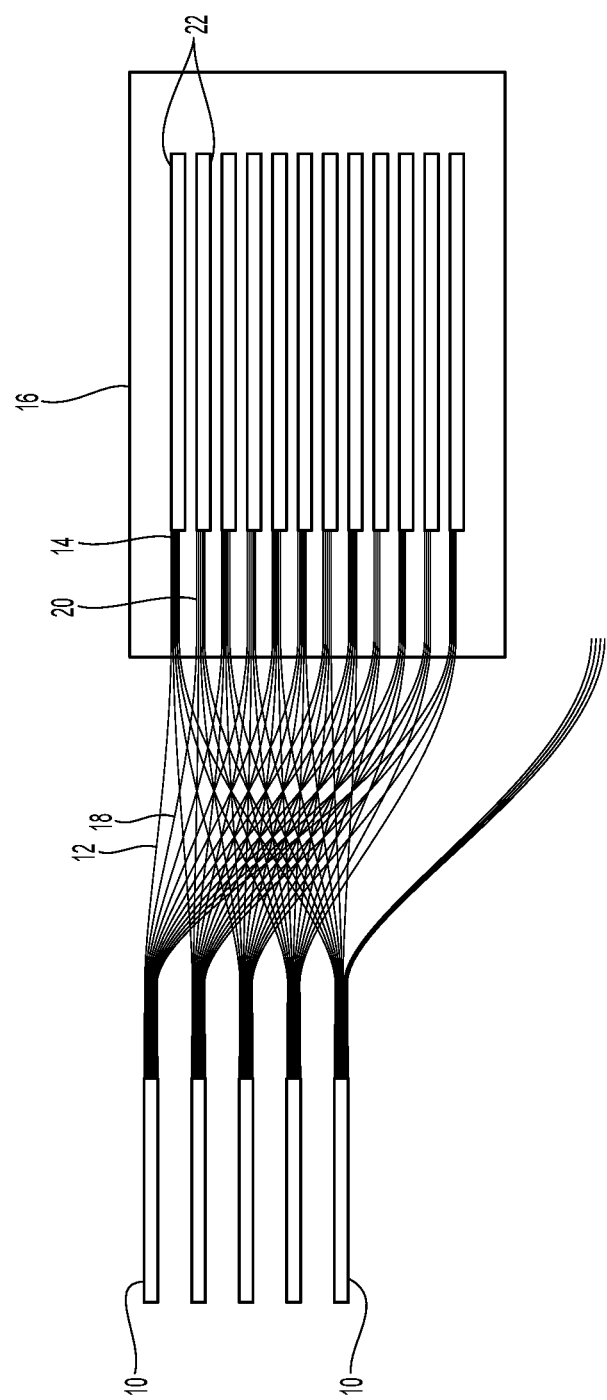
FIG. 1 is a top view of a prior art method of rearranging optical fibers.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
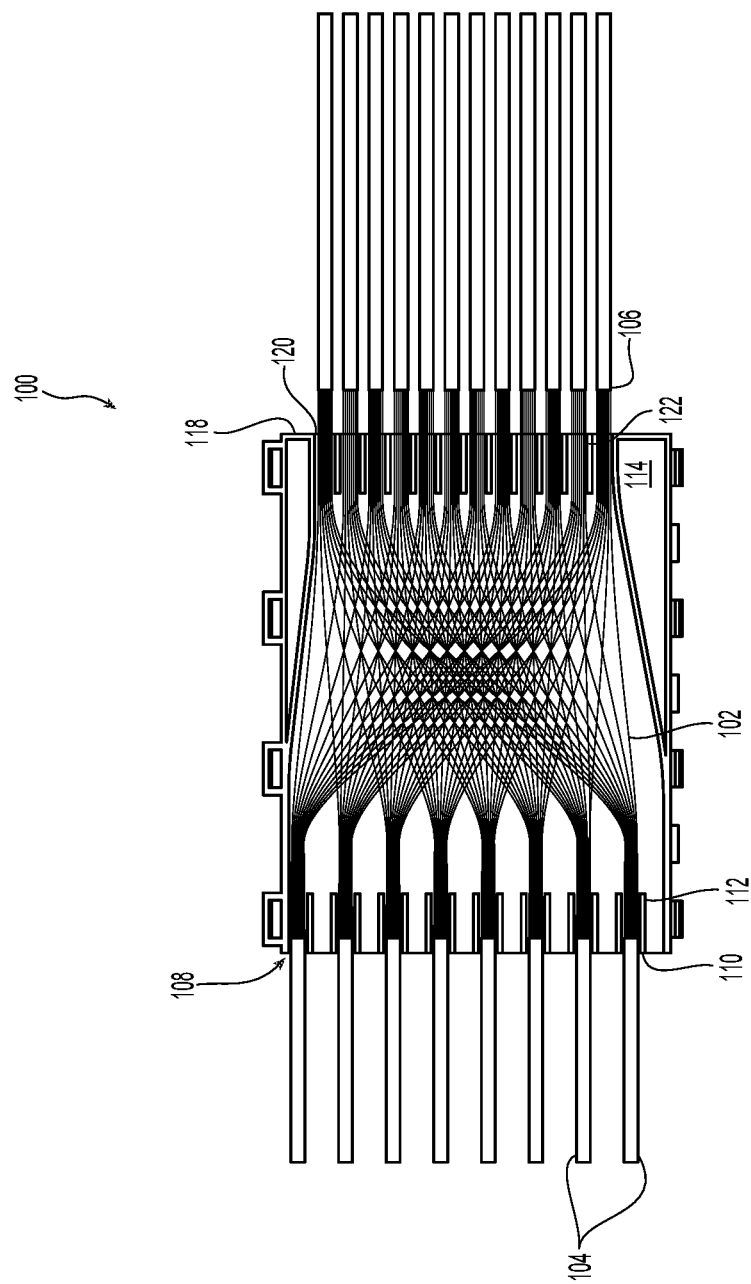
FIG. 2 is a top view of one embodiment of a device for reorganizing optical fibers according to the present invention.
Figure 3:
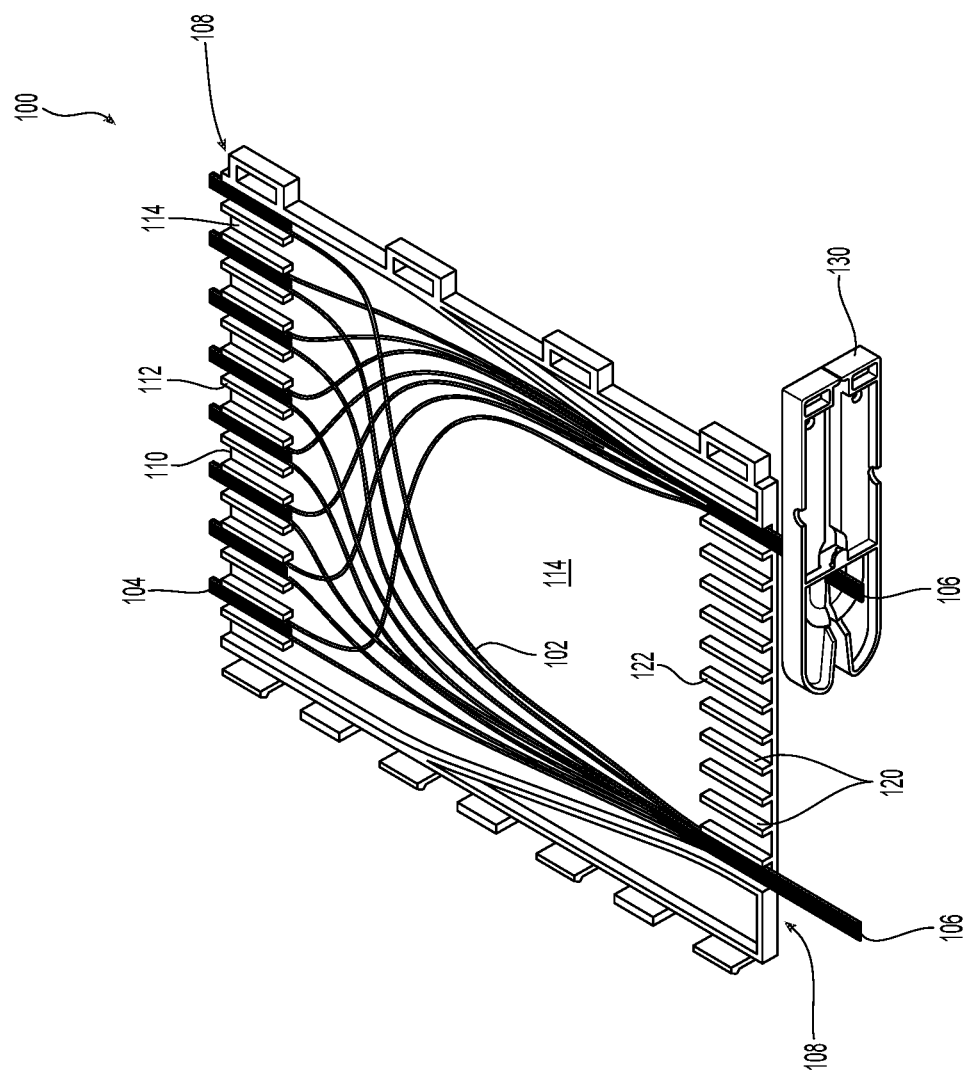
FIG. 3 is a perspective view of the device for reorganizing optical fibers in FIG. 2 showing the ribbonization of the optical fibers after reorganization.

Referring to FIGS. 2 and 3, a device 100 for reorganizing optical fibers 102 from a first grouping or set 104 to a second grouping or set 106 is illustrated. The first grouping or set 104 of optical fibers may include a fiber optic cable that has twelve loose or ribbonized optical fibers 102. The first grouping 104 of optical fibers 102 may also be 12 (or more or fewer) ribbonized optical fibers 102 that may or may not have another protective covering. However, as noted above, the optical fibers 102 in a cable or ribbon are in order by color: blue, orange, green, brown, slate, white, red, black, yellow, violet, rose, and aqua. The device 100 has a proximal end 108 having a number of openings 110 through which the optical fibers 102 in the first grouping 104 pass. As illustrated in FIGS. 2 and 3, the openings 110 are essentially U-shaped and include a divider 112 between each of the openings and a bottom portion 114 to define each of the openings 110. The bottom portion 114, which may extend the length and width of the device 100 also acts as a tray to support and protect the optical fibers 102 from the surface on which the device 100 is placed.

Figure 4:
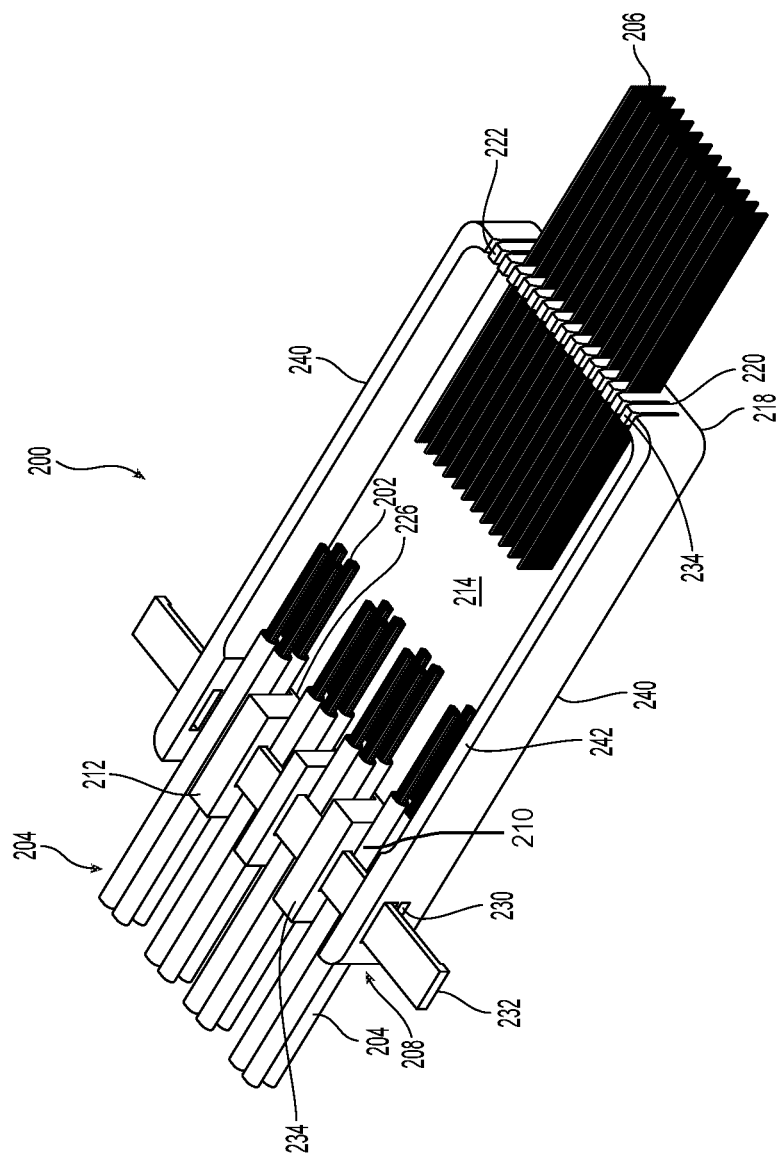
FIG. 4 is another embodiment of a device for reorganizing optical fibers according to the present invention.

The device 100 also has a distal end 118 where there is a number of openings 120 to receive and organize the individual optical fibers 102. While there are a different number of openings 110 at the proximal end 108 (eight are illustrated) than there are openings 120 at the distal end 118 (twelve are illustrated), there may be the same number of openings at both the proximal end 108 and the distal end 118. Alternatively, there could be more openings 120 at the distal end 118 than at the proximal end 108. It is also to be noted that while one grouping of optical fibers 102 is illustrated as occupying a single opening 112, there could be more than one grouping of optical fibers in each of the openings 112. See, e.g., FIG. 4. It is also possible that there be only one large opening 110 at the proximal end 108, depending on the number of sets of optical fibers or the configuration in which the optical fibers are presented. If the first grouping 104 includes a fiber optic cable with a plurality of 12 fiber ribbons, then only one opening 110 may be needed.

The openings 120 at the distal end 118 also have a number of dividers 122. The openings 120 should be wide enough to hold the number of optical fibers in the desired fiber ribbon between the dividers 122. As illustrated in FIGS. 2 and 3, the bottom portion 114 extends from the proximal end 108 to the distal end 118 and the optical fibers lie flat on the bottom portion 114. If there were no bottom portion 114, then the optical fibers 102 would lie flat on the surface upon which the device 100 is placed.

In FIG. 3, only some of the optical fibers 102 are illustrated to make the illustration more clear. However, as noted above, the fiber optic cables and ribbons usually include 12 optical fibers, which is why there are 12 openings 120 at the distal end 118. Some fiber optic cables may include multiple sets of 12 optical fibers, too.

As illustrated in FIG. 3, the optical fibers 102, once they have been rearranged and are in order at second groupings 106, the optical fibers 102 are preferably secured to prevent the order of the optical fibers from being accidentally changed. In this case, the optical fibers 102 are illustrated being ribbonized using the fiber ribbonizing tool 130 provided by the Applicant of this applicant, US Conec, Ltd., which is fully described and covered by U.S. Pat. No. 9,128,214, the contents of which are incorporated herein in their entirety. Alternatively, the optical fibers 102 could be secured in other ways, including a heat shrink tube, etc.

A second embodiment of a device 200 for reorganizing optical fibers 202 from a first grouping or set 204 to a second grouping or set 206 is illustrated. The first grouping or set 204 of optical fibers is illustrated as 16 different fiber optic cables that have twelve ribbonized optical fibers 202. Again, the first grouping 204 of optical fibers 202 may also be 12 (or more or fewer) ribbonized optical fibers 202 that may or may not have another protective covering. (It should be noted that with the 192 total optical fibers 202 in device 200, showing the path of each of those fibers would be less than clear and the center portion of the reorganization of optic fibers therefore has been eliminated for clarity purposes).

Figure 4A:
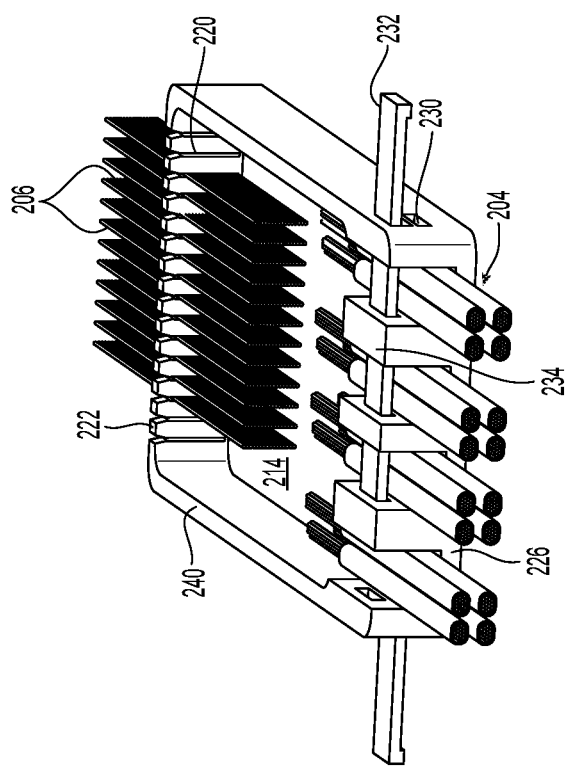
FIG. 4A is perspective view of the device in FIG. 4 from the opposite side.

The device 200 has a proximal end 208 having a number of openings 210 through which the optical fibers 202 in the first grouping 204 pass. The openings 210 are essentially U-shaped due to divider 212 between each of the openings 210 and a bottom portion 214. The bottom portion 214, which may extend the length and width of the device 200, also acts as a tray to support and protect the optical fibers 202 from the surface on which the device 200 is placed. Each of the dividers 212 also have a passageway 230 that is in communication with the opening 210 on either side of the divider 212. The passageways 230 are configured to receive a retaining member 232, which when inserted into the passageway 230 makes the openings 210 into a square or rectangular shape (from the U-shaped openings noted above). This helps to retain the first groupings 204 of optical fibers 202 within the device 200 at proximal end 208. The dividers 212 also have a top surface 234 that is flat and parallel to the bottom portion 214 and the axis of the optical fibers, i.e., from proximal end to distal end. The dividers 212 also have a bottom portion 226 that is attached to the proximal end 208. See FIG. 4A.

The device 200 also has a distal end 218 where there are a number of openings 220 to receive and organize the individual optical fibers 202. Again, there can be a different number of openings 210 at the proximal end 208 than there are openings 220 at the distal end 218, or the same number.

The openings 220 at the distal end 218 also have a number of dividers 222. The dividers 222 have a top surface 234 and the openings 220 are vertical relative to the device 200. As illustrated in more detail in FIG. 5, the openings 220 extend from the top surface 234 towards the bottom surface 214. This is rotated 90 degrees relative to the other embodiment, meaning that the optical fibers 202 are positioned on top of one another rather than side-by-side. The openings 220 have a width that is preferably smaller than the width of two optical fibers (optical fibers have a diameter and thus a width of about 125 microns). Thus, the openings 220 would have a width of less than 250 microns to prevent the optical fibers 202 from moving in order relative to one another. Once an optical fiber 202 is placed within the opening 220, the order does not change relative to the other fibers in the opening 220. Thus, if an optical fiber is placed in the opening 220 as the third one, it will not be able to slide past other optical fiber and change positions (to second or fourth) within the opening 220.

Figure 5:
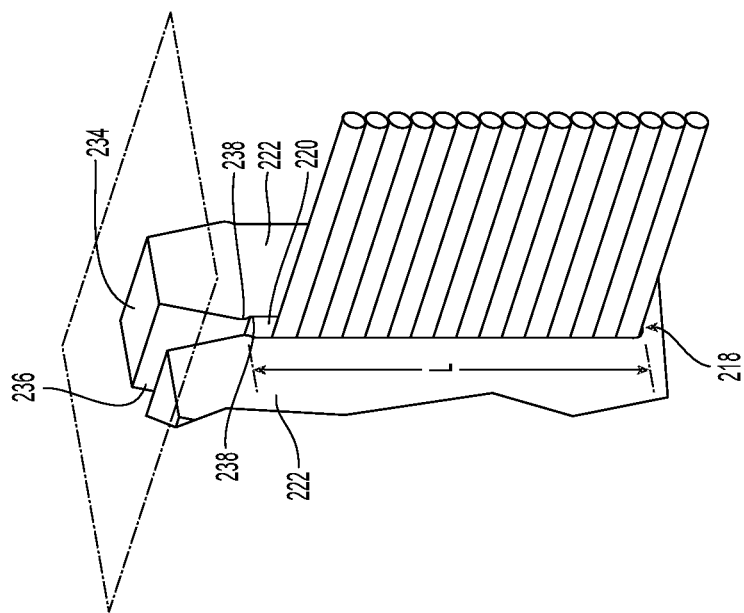
FIG. 5 is a perspective view of a portion of the distal end of the device for reorganizing optical fibers of FIG. 4.

The dividers 222 at the distal end 218 also have a chamfered surface 236 that extends from the top surface 234 towards to the bottom surface 214. At the end of the chamfered surface 236 is a projection 238 that extends into the opening 220. The projections 238 narrow the openings 220 to less then the width of an optical fiber—125 microns. The dividers 222 are somewhat resilient and can be moved slightly as the fibers are inserted into the opening 220. Thus, when an optical fiber 202 is inserted into the opening 220, at least one of the dividers 222 on either side of the opening 220 flexes outward to allow the optical fiber 202 to be inserted past the projection 238 and into the opening 220 below the projections 238. The projections 238 prevent the optical fibers from exiting out of the openings 220 back up and through the top surface 234. There are two projections illustrated in FIG. 5, but there could be a projection 238 on only one side and there need not be a chamfered surface 236. The openings 220 may be of any length as illustrated in FIG. 5. Indeed, there can be separate devices 200 for different numbers of optical fibers being reorganized. In the embodiment of device 200, there are 16 fibers illustrated that are to be distributed to each of the openings 220. However, there could only be 8, 12, or any other number of optical fibers. As such, the technician may have the option for using a smaller device (or thinner device given that the openings 220 extend from above the surface of the bottom portion 214 toward the top surface 234 of the dividers 222) to reorganize the optical fibers.

The device 200 may also have other ways to retain the optical fibers 202 within the openings 220 and not use the projections 238. As an example, the openings 220 may be only the width of the optical fiber, preventing the optical fiber from moving within the slot due to engagement of the optical fiber with the dividers 222. There may also be a pressure sensitive adhesive that is applied in the openings 220 to retain the optical fibers 202 therein.

The device 200 also has side walls 240 to assist in protecting the optical fibers 202. The two side walls 240 extend from the proximal end 208 to the distal end 218 and have a top surface 242, which is parallel to and even with the top surfaces of the dividers 212 and 222. Indeed, the dividers 212 and 222 could be considered to be a part of walls that extend along the proximal end 208 and the distal end 218 to join with walls 240, with the openings 210 and 220 interrupting the walls at the proximal and distal ends 208,218 above the bottom portion 214.

Figure 6:
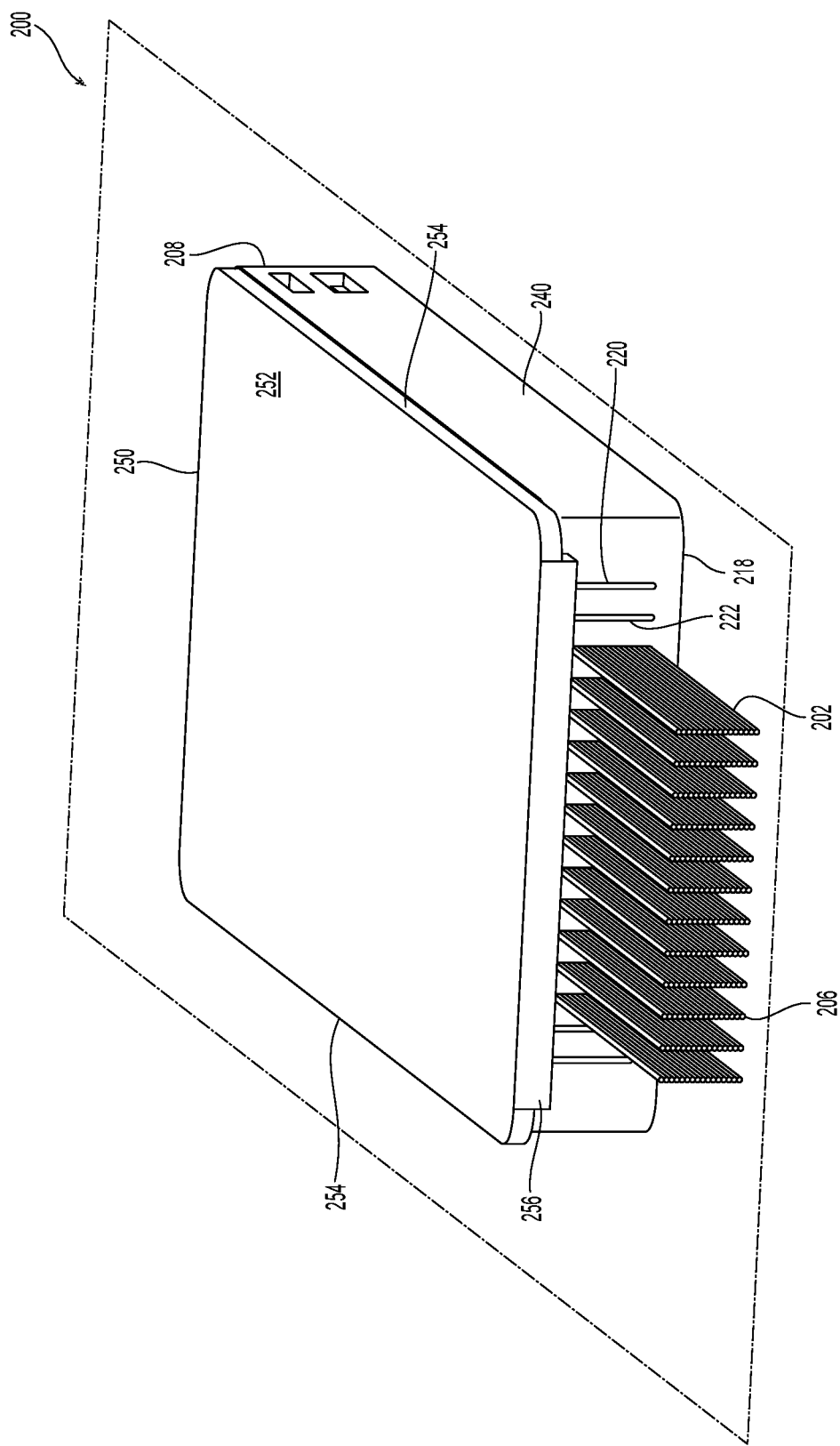
FIG. 6 is a perspective view of the device for reorganizing optical fibers of FIG. 4 with a lid.

Another view of the device 200 is in FIG. 6 from the distal end 218 with a lid or top 250. The lid 250 has a main body portion 252, the underside of which is to engage the upper surfaces of the dividers 234 and the upper surface 242 of the walls 240, if present. The lid 250 has at least four edges 254 and one side portion 256, the side portion 256 extends from the main body 252 adjacent one edge 254 in a generally orthogonal direction to a plane in which the main body lies. The side portion 256 aligns with the distal end 218 (beyond the end of the device 200 as the optical fibers exit the device 200) to compress the optical fibers 202 in each of the openings 220. This allows the optical fibers 202 to be ribbonized quite easily. The distance that the side portion 256 extends downward below the main body 252 will determine the compression of the optical fibers 202. As a result, a given device 200 may have a number of lids 250 with different sizes of side portions 256. For the device 200 as illustrated, a lid 250 for compressing 16 optical fibers would have a shorter side portion 256 than a lid for compressing 12 optical fibers since there would be more space between the top optical fiber and the top surface 234 of the dividers 222 for 12 optical fibers. Similarly, the side portion 256 would be longer for 8 fibers than one for 12 optical fibers, again because of the larger space between the top optical fiber and the top surface 234 of the dividers 222 when there are just 8 optical fibers.

Figure 7A:
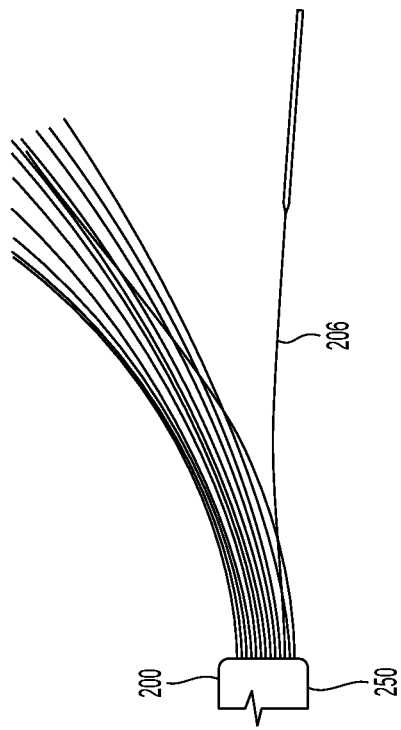
FIG. 7A is a partial view from the top of the device for reorganizing optical fibers in FIG. 4 with the ends of the reorganized optical fibers being treated.
Figure 7B:
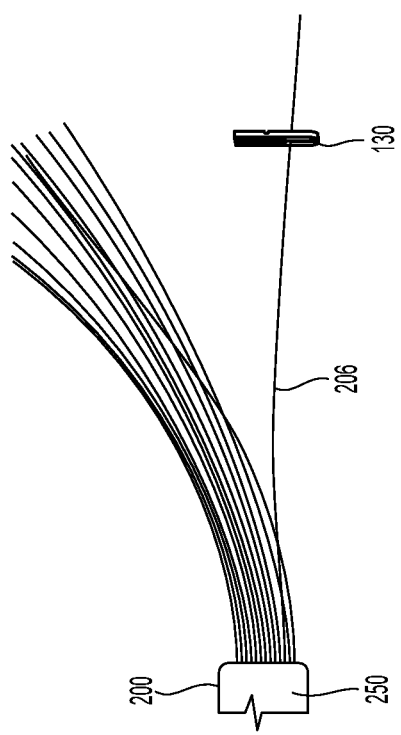
FIG. 7B is a partial view from the top of the device for reorganizing optical fibers in FIG. 4 with the ends of the reorganized optical fibers being treated.

FIGS. 7A and 7B illustrate what can be done with the optical fibers 202 that have been reorganized or rearranged using the device 200. In many applications, the second sets of optical fibers 206 (and 106) will be ribbonized to be installed in multi-fiber ferrules. As illustrated in FIG. 7A, a second grouping of optical fibers 206 are ribbonized while still being held within the device 200. One method of ribbonizing the second groupings 206 of optical fibers 202 is using the fiber ribbonizing tool 130, noted above. It is also possible to use other methods of ribbonizing the second grouping 206 of optical fibers 202. It is important to keep the order of the optical fibers 202 in the second grouping 206. Alternatively, the fiber ribbonizing tool 130 could be used to ribbonize the ends of the optical fibers (to maintain the order) and the remainder of the length of the opticals fibers could be ribbonized in a different way or otherwise protected (e.g., inserted into a split tube, or wrapped with a spiral wrap). FIG. 7B shows the ends of the second grouping 206 of optical fibers 202 ribbonized and ready for other protection. Additionally, it should be noted that the optical fibers could be first fed through a heat shrink tube after exiting the device 200 and order of the optical fibers is maintained on the other side of the heat shrink tube.

Figure 8:
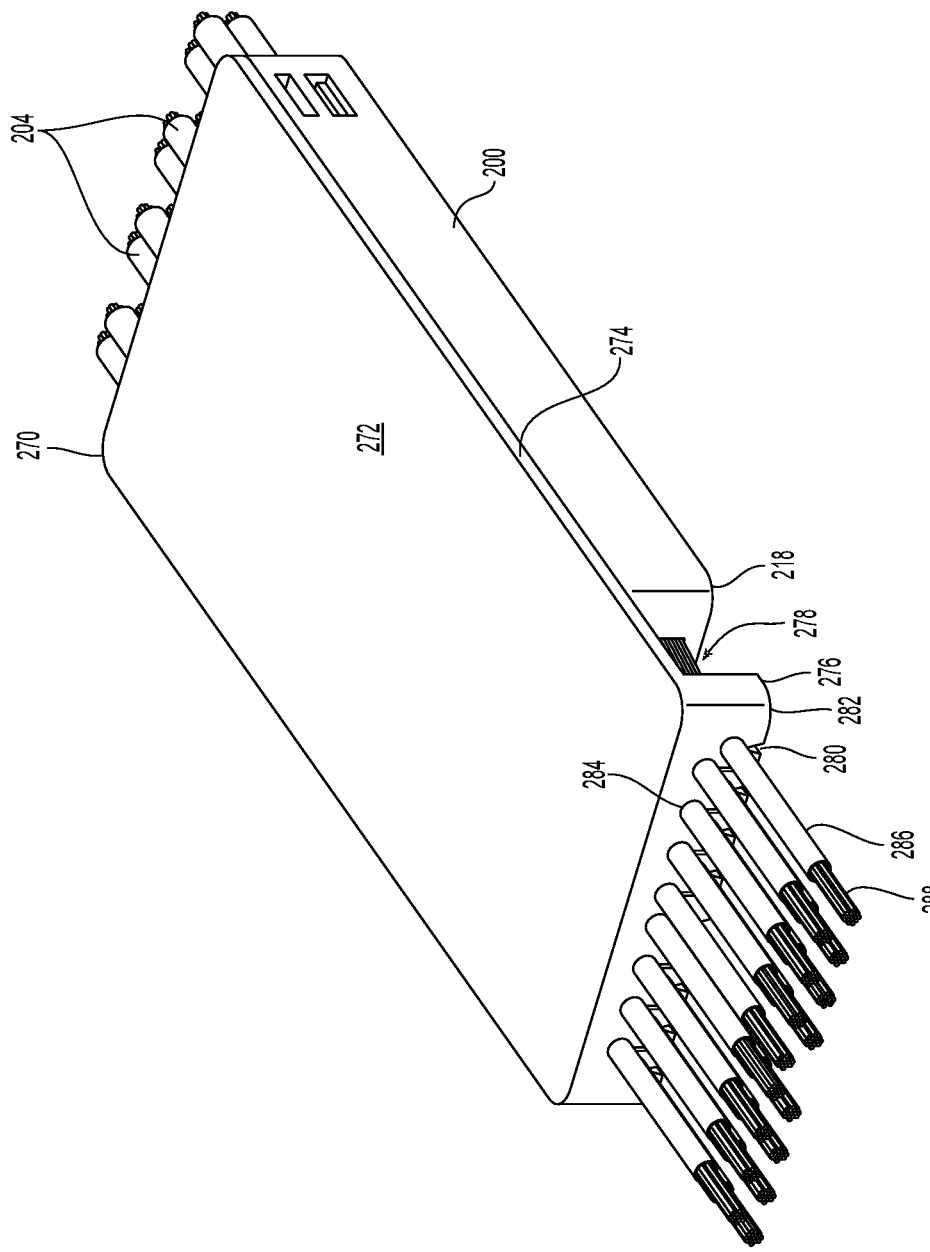
FIG. 8 is a perspective view of the device for reorganizing optical fibers of FIG. 4 with a different lid.
Figure 9:
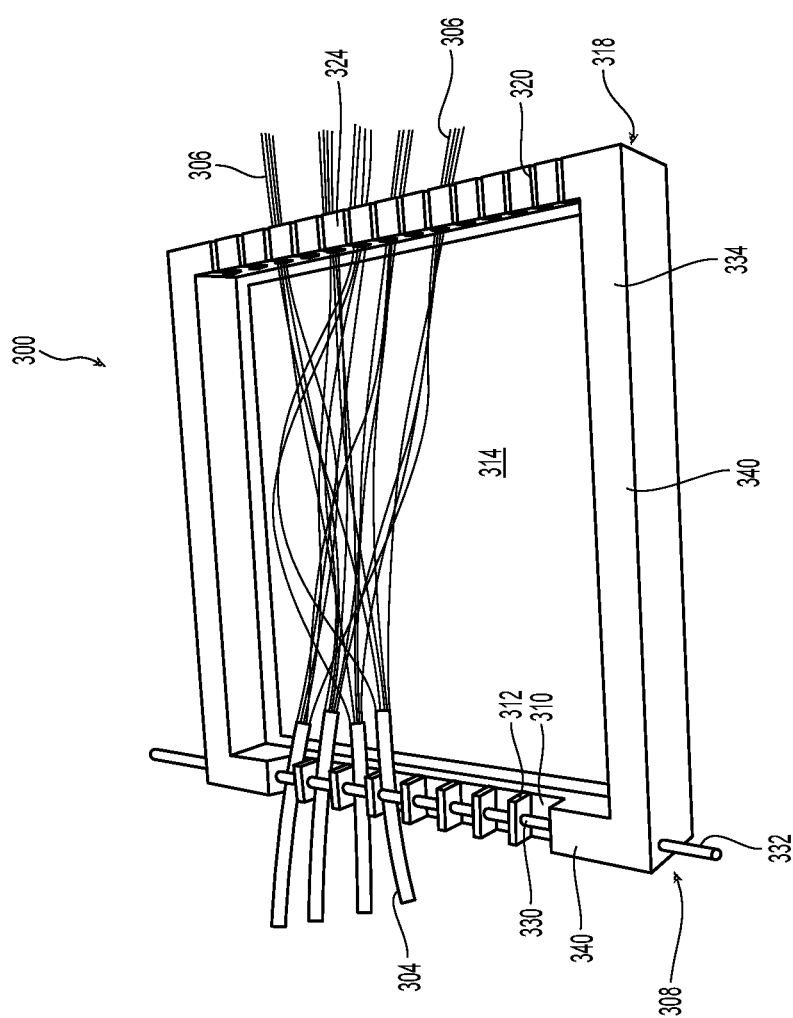
FIG. 9 is a perspective view of a another embodiment of a device for reorganizing optical fibers according to the present invention.

Another variation of a lid 270 that can be used with the device 200 is illustrated in FIG. 8. The lid 270 has a main body portion 272, the underside of which is to engage the upper surfaces of the dividers 234 and the upper surface 242 of the walls 240 as in the prior embodiment. The lid 270 has edges 274 and one side portion 276. The main body portion 272 extends beyond the distal end 218 of the device 200 more than the prior lid. This allows there to be a space 278 between the distal end 218 and the side portion 276. The side portion 276 has slots 280 that extend from the bottom edge 282 of the side portion 276 upward toward the center of the side portion 276 and terminate in a round opening 284. Thus, the second grouping 206 of optical fibers 202 exit the device 200 in a ribbon format and then transition to a round bundle because of the round opening 284 in the side portion 276. The optical fibers 202 can be inserted into a heat shrink tube 286 as they exit the round openings 284. The ends 288 of the optical fibers 202 of the second grouping 206 can then be ribbonized prior to placing the heat shrink over the optical fibers so as not to lose the order of the optical fibers and mounted in multi-fiber ferrules (not shown). Additionally, the heat shrink tubes 286 can be secured to the lid 270 to provide further protection of the optical fibers 202.

Another embodiment of a device 300 for reorganizing optical fibers 302 from a first grouping or sets 304 to a second grouping or set 306 is illustrated. The first grouping or set 304 of optical fibers is illustrated as 4 loose optical fibers in 4 different cable jackets, but may be of any number of optical fibers and sets of configurations.

The device 300 has a proximal end 308 having a number of openings 310 through which the optical fibers 302 in the first groupings 304 pass. The openings 310 are voids in a wall 340, which create dividers 312 between the openings 310. The dividers 312 have passageways 330 that are in communication with the opening 310 on either side of the divider 312. The passageways 330 are configured to receive a retaining member 332, which when inserted into the passageway 330 makes the openings 310 into a square or rectangular shape and helps to retain the first groupings 304 of optical fibers 302 within the device 300.

The device 300 may have a bottom portion 314, which may extend the length and width of the device 300 or be open. The dividers 312 also have a top surface 334 that is flat and parallel to the bottom portion 314 and the axis of the optical fibers, i.e., from proximal end to distal end.

The device 300 also has a distal end 318 where there are a number of openings 320 to receive and organize the individual optical fibers 302 into the second grouping or set 306. Again, there can be a different number of openings 310 at the proximal end 308 than there are openings 320 at the distal end 318, or the same number.

The openings 320 at the distal end 318 extend from the top surface of the wall 340 downward into the wall. The openings 320 are more L-shaped due to the openings penetrating downward from the top surface 334 and then make a right turn in a horizontal direction. See also FIG. 10. The openings 320 have a width that is preferably smaller than the width of two optical fibers (optical fibers have a diameter and thus a width of about 125 microns). Thus, the openings 320 would have a width of less than 250 microns to prevent the optical fibers 302 from moving in order relative to one another. Once an optical fiber 302 is placed within the opening 320, it does not move sideways (due to the right turn of the opening) relative to the other fibers in the opening 320. The openings 320 also have projections 338 that extend into the openings 320 from the wall 340. As with the prior embodiments, there may be more than one projection 338 that narrows the openings 320 to less than the width of the opening 320.

Another embodiment of a device 400 for reorganizing optical fibers is illustrated. In this embodiment, the device is thinner (from top surface of the walls 440 and dividers 412, 422 to the bottom surface 414) but wider than the other embodiments. The openings 420 at the distal end 418 are also L-shaped as in the prior embodiment. There are also dividers 422 that are positioned between the opening 420, but are inside the device 400 from the openings 420. The dividers 420 assist in inserting the optical fibers 402 into the openings 420. With the openings 420 having an L-shape and also having the projections 438, this embodiment is therefore like a combination of the first device 100 and the second device 200. The device 400 is wider to allow for better visualization of the optical fibers but includes the openings 420 at the distal end 418 that prevent the optical fibers from moving relative to one another as is possible with device 100.

Figure 10:
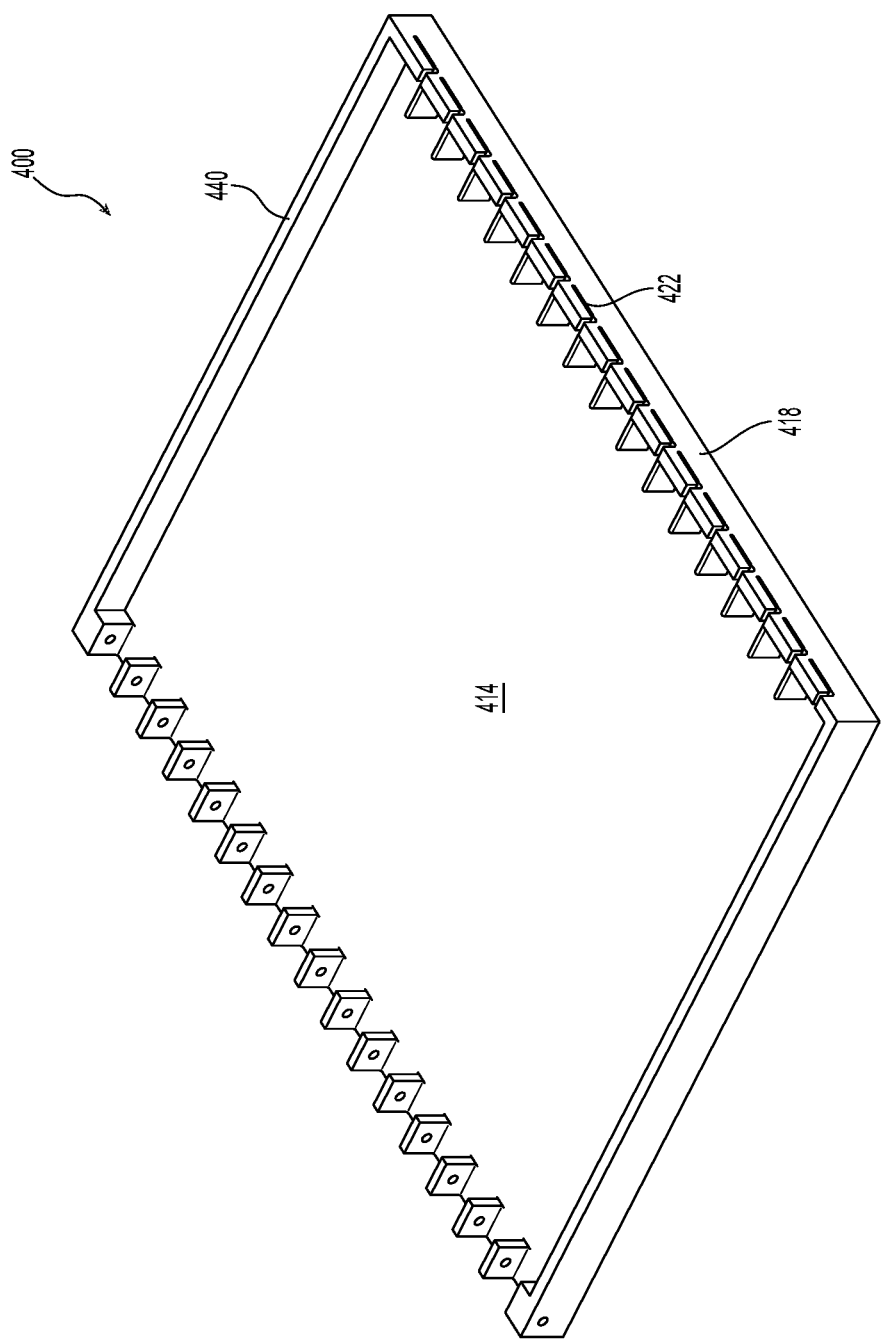
FIG. 10 is a perspective view of a another embodiment of a device for reorganizing optical fibers according to the present invention that is similar to FIG. 9 but with more openings for optical fibers.
Figure 11:
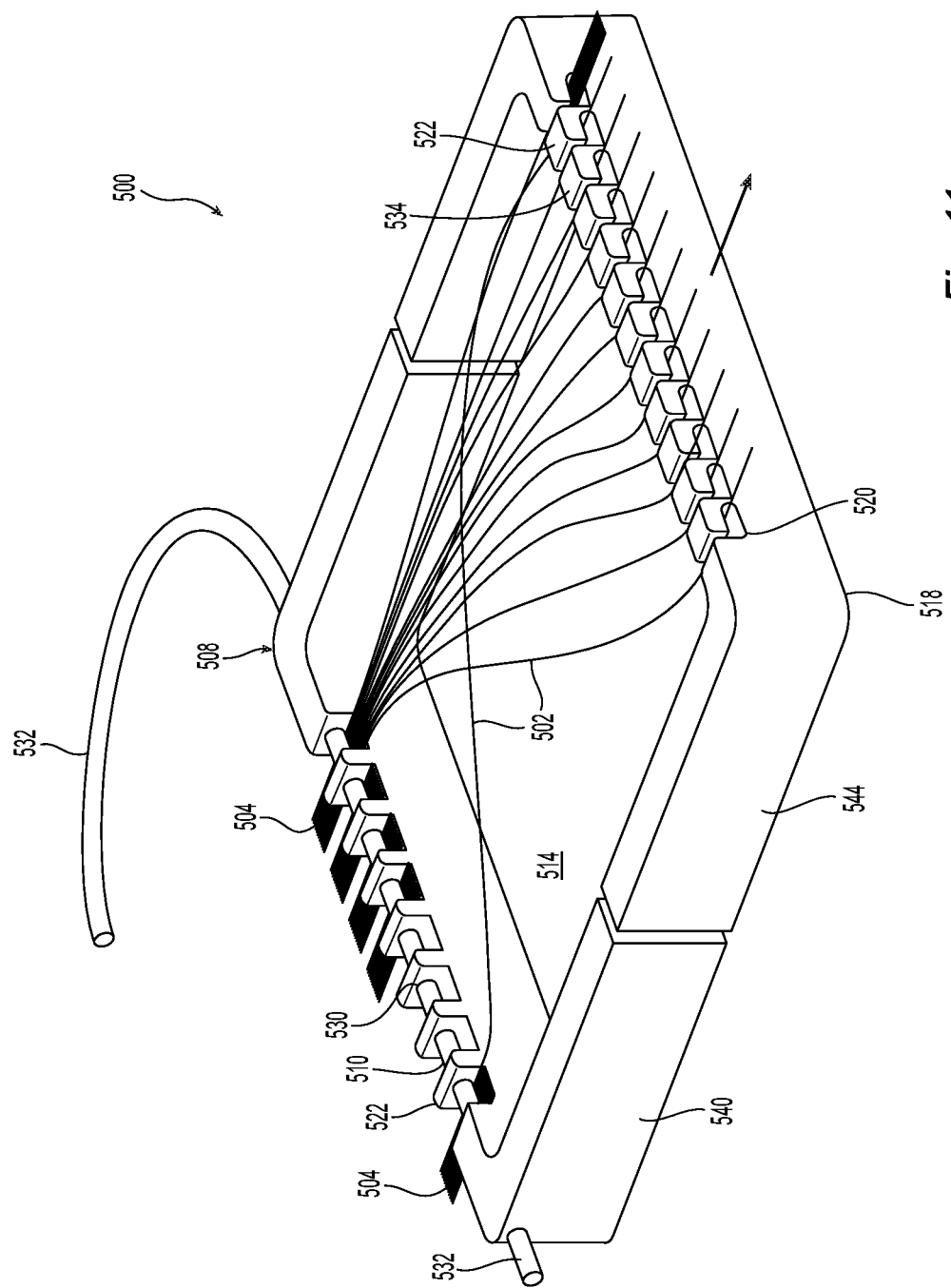
FIG. 11 is a perspective view of a another embodiment of a device for reorganizing optical fibers according to the present invention in a first position.

Another embodiment of a device 500 is illustrated in FIGS. 10 and 11. The device 500 is very similar to devices 300 and 400, but allows for the ribbonization of the optical fibers after they have been reorganized. As illustrated in FIG. 11, the device 500 is for reorganizing optical fibers 502 from a first grouping or set 504 to a second grouping or set 506. The first grouping or set 504 of optical fibers is illustrated as optical fiber ribbons, but could be any configuration (ribbons, cables, etc. as with the other embodiments) and any number of optical fibers.

The device 500 has a proximal end 508 having a number of openings 510 through which the optical fibers 502 in the first grouping 504 pass. The openings 510 are U-shaped openings in a wall 540 at the proximal end 518. There is a divider 512 between each of the openings 510. Each of the dividers 512 also have a passageway 530 that is in communication with the opening 510 on either side of the divider 512. The passageways 530 are configured to receive a retaining member 532, which when inserted into the passageway makes the openings 510 into a square or rectangular shape (from the U-shaped openings noted above). This also helps to retain the first groupings 504 of optical fibers 502 within the device 500. The dividers 512 also have a top surface 534 that is flat and parallel to the axis of the optical fibers, i.e., from proximal end to distal end. The dividers 512 also have a bottom portion 536 that is attached to the proximal end 508 (or is considered to be a portion of the wall 540).

The device 500 also has a distal end 518 where there are a number of openings 520 to receive and organize the individual optical fibers 502. Again, there can be a different number of openings 510 at the proximal end 508 than there are openings 520 at the distal end 518, or the same number.

The openings 520 at the distal end 518 also have a number of dividers 522. The dividers 522 have a top surface 534 and the openings 520 are more L-shaped due to the openings 520 penetrating downward from the top surface 534 and then make a right turn in a horizontal direction. The openings 520 have at least a portion where the width is smaller than the width of two optical fibers. Thus, the openings 520 would have a portion where the width is less than 250 microns to prevent the optical fibers 502 from moving in order relative to one another. Once an optical fiber 502 is placed within the opening 520, it does not move relative to the other fibers in the opening 520, i.e., it will not be able to slide past other optical fibers and change positions within the opening 520.

Figure 12:
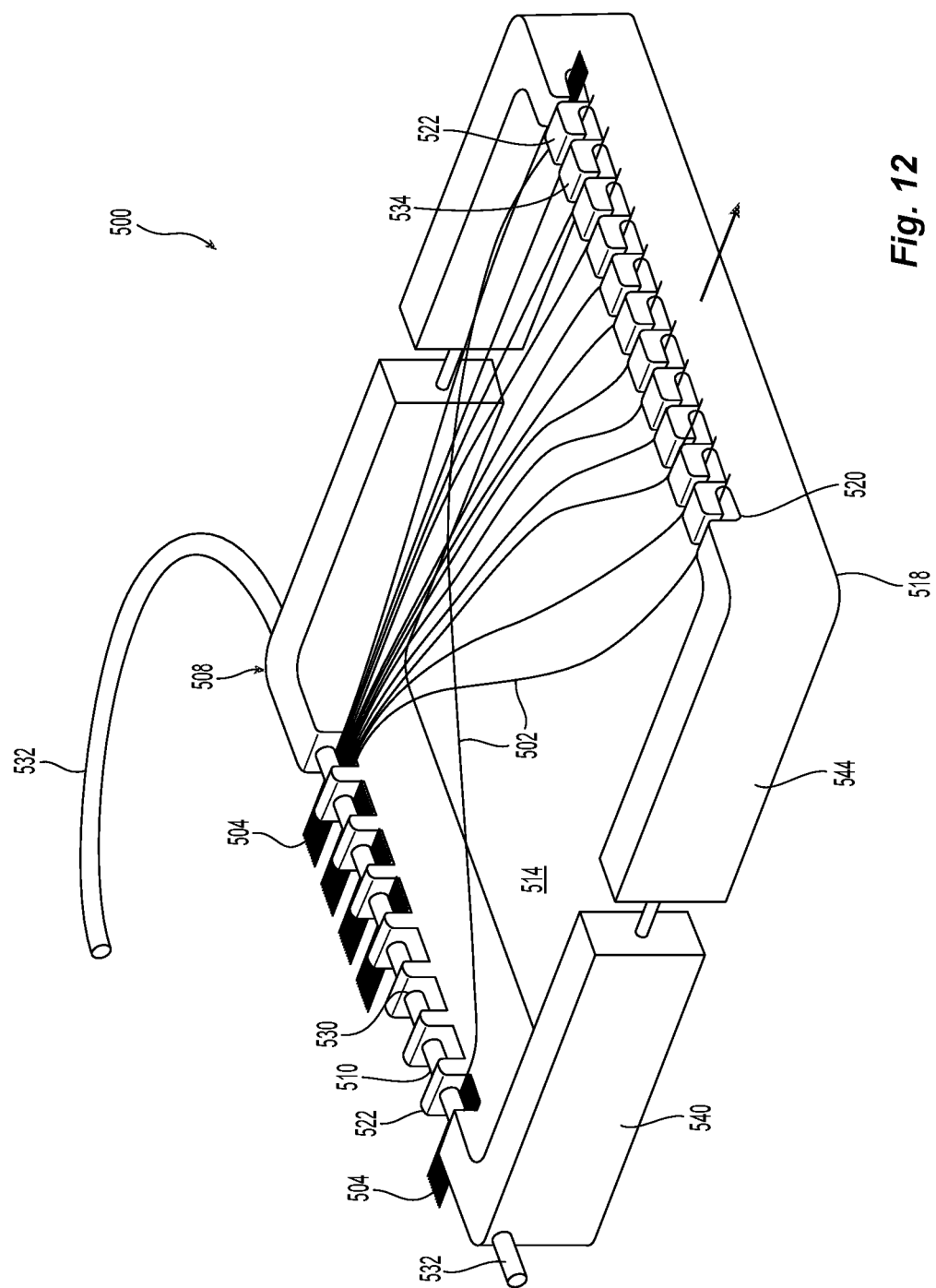
FIG. 12 illustrates the device in FIG. 11 in a second position.

The dividers 522 may have a projection 538 that extends into the opening 520. The projections 538 narrow the openings to less than the width of an optical fiber—125 microns. The dividers 522 are somewhat resilient and can be moved slightly by a technician. Thus, when an optical fiber 502 is inserted into the opening 520, at least one of the dividers 522 on either side of the opening 520 flexes to allow the optical fiber 502 to be inserted into the opening beyond the projections 538. The projections 538 prevent the optical fibers from exiting out of the openings 520. The distal end 518 also has a wall portion 544 that is connected to, but movable relative to, wall 540. The wall portion 544 can be moved relative to wall 540 in order to ribbonize the optical fibers exiting from the openings 522. The openings 522 may have ribbonizing material disposed therein after the rearrangement of the optical fibers. Since the optical fibers are locked into the arrangement by the width of the openings 522, moving the two portions of the device 500 relative to one another would cause ribbonizing material to be spread along the optical fibers 502 when moved from the first position of FIG. 11 to the second position in FIG. 12.

The device 500 may have a bottom portion 514, which may extend the length and width of the device 500, also acts as a tray to support and protect the optical fibers 502 from the surface on which the device 500 is placed. However, the bottom portion is not connected to the wall 540 and wall 544 (i.e., all the way around the device 500). Rather, if a bottom portion 514 is provided (it need not be), the bottom portion could occupy the entirety of the device 500 in the first position of FIG. 11. However, the bottom portion 514 can only be attached to one of the walls 540 and 544 so that the two walls can be moved relative to one another.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents

We claim:

1. A device for receiving optical fibers, the optical fibers having a diameter, the device comprising:
a first plurality of openings through which at least two optical fibers pass, each of the first plurality of openings having a divider therebetween, each opening in the first plurality of openings having a width that is greater than the diameter of the optical fibers but is less than twice the diameter of the optical fibers.

2. The device for receiving optical fibers according to claim 1, further comprising a proximal end having at least one opening through which at least two optical fibers pass and wherein the first plurality of openings are at a distal end of the device.

3. The device for receiving optical fibers according to claim 2, wherein the at least one opening at the proximal end comprises a second plurality of openings, each of the openings in the second plurality of openings having a divider therebetween, the device further comprising at least one projection extending into each of the first plurality of openings, the projection narrowing the opening to less than a diameter of an optical fiber.

4. The device for receiving optical fibers according to claim 3, wherein the at least one projection comprises two projections, and one projection is disposed on either side of each of the first plurality of openings.

5. The device for receiving optical fibers according to claim 3, wherein each of the dividers have a top surface and a bottom end, the bottom end connected to the distal end, and each of the openings in the first plurality of openings extend from the top surface of the divider toward the bottom end thereof.

6. The device for receiving optical fibers according to claim 2, wherein no two optical fibers occupy the same opening at the proximal end and at the distal end.

7. The device for receiving optical fibers according to claim 2, wherein the dividers at the proximal end and the distal end have an upper surface, the upper surface being flat and parallel to an axis extending along a length of the optical fibers and further comprising a lid, the lid having a main body portion to engage the upper surfaces of the dividers, the lid having at least four edges and one side portion, the side portion extending from the main body adjacent one edge in a generally orthogonal direction, the side portion aligning with the distal end to compress the optical fibers in each of the first plurality of openings.

8. The device for receiving optical fibers according to claim 2, wherein each of the dividers at the proximal end has a passageway extending therethrough and in communication with at least two openings to receive a retaining member therein to retain the optical fibers within the opening.

9. The device for receiving optical fibers according to claim 2, wherein the device has four walls and is generally rectangular in configuration, two opposing walls comprising the proximal end and the distal end and the other two walls being opposed to one another and separating the proximal and distal ends.

10. The device for receiving optical fibers according to claim 9, wherein the each of the other two walls is extendable from a first position to a second position, each of the side walls being longer in the second position than in the first position.

11. The device for receiving optical fibers according to claim 2, further comprising two side walls extending between the proximal and distal ends to generally form a rectangular structure, the side walls and the dividers having a top surface.

12. The device for receiving optical fibers according to claim 11, wherein the each of the side walls is extendable from a first position to a second position, each of the side walls being longer in the second position than in the first position.

13. A device for receiving optical fibers, the optical fibers having a diameter, the device comprising:
a first plurality of openings through which at least two optical fibers pass, each of the first plurality of openings having a divider therebetween, each of the first plurality of openings having a width that is greater than the diameter of the optical fibers but is less than twice the diameter of the optical fibers; and
at least one projection extending into each of the first plurality of openings, the projection narrowing the opening to less than a diameter of an optical fiber.

14. The device for receiving optical fibers according to claim 13, further comprising a proximal end having at least one opening through which at least two optical fibers pass, wherein the first plurality of openings are at a distal end of the device, and wherein the at least one opening at the proximal end comprises a second plurality of openings, each of the openings in the second plurality of openings having a divider therebetween.

15. The device for receiving optical fibers according to claim 14, further comprising a bottom surface on which the optical fibers can lay during reorganization.

16. The device for receiving optical fibers according to claim 14, wherein each of the dividers at the proximal end has a passageway extending therethrough and in communication with at least two openings to receive a retaining member therein to retain the optical fibers within the opening.

17. The device for receiving optical fibers according to claim 14, further comprising a lid, the lid having a main body portion with at least four edges and one side portion, the side portion extending from the main body adjacent one edge in a generally orthogonal direction, the side portion aligning with the distal end to compress the optical fibers in each of the first plurality of openings.

18. The device for receiving optical fibers according to claim 17, wherein the side portion extends away from the main body by a length that corresponds to the number of optical fibers in the first plurality of openings.

19. The device for receiving optical fibers according to claim 17, wherein the lid extends beyond the distal end opposite the first end, the side portion having a plurality of passageways extending therethrough and having a longitudinal axis that is parallel to the main body, each of the plurality of passageways configured to receive optical fibers from one of the first plurality of openings.

20. The device for receiving optical fibers according to claim 19, wherein each of the passageways is cylindrical to allow optical fibers there to be inserted into a heat shrink tube.

* * * * *